(12) United States Patent
Inami et al.

(10) Patent No.: US 9,797,446 B2
(45) Date of Patent: Oct. 24, 2017

(54) SLIDE MEMBER, HOUSING, AND BEARING DEVICE

(71) Applicant: DAIDO METAL COMPANY LTD., Nagoya-shi, Aichi-ken (JP)

(72) Inventors: Shigeru Inami, Inuyama (JP); Colin McAleese, Inuyama (JP)

(73) Assignee: DAIDO METAL COMPANY LTD., Nagoya-Shi, Aichi-Ken (JP)

( * ) Notice: Subject to any disclaimer, the term of this patent is extended or adjusted under 35 U.S.C. 154(b) by 138 days.

(21) Appl. No.: 14/958,115

(22) Filed: Dec. 3, 2015

(65) Prior Publication Data

US 2016/0160918 A1    Jun. 9, 2016

(30) Foreign Application Priority Data

Dec. 3, 2014  (JP) ................. 2014-244922

(51) Int. Cl.
*F16C 33/04*    (2006.01)
*F16C 17/02*    (2006.01)
(Continued)

(52) U.S. Cl.
CPC .......... *F16C 33/043* (2013.01); *F16C 33/125* (2013.01); *F16C 35/02* (2013.01);
(Continued)

(58) Field of Classification Search
CPC .... F16C 33/043; F16C 33/125; F16C 33/203; F16C 2206/04
(Continued)

(56) References Cited

U.S. PATENT DOCUMENTS 9,274,470 B2 *   3/2016   Nakayama ......... G03G 15/2053

FOREIGN PATENT DOCUMENTS

JP    2000-205279 A  *  7/2000
JP    2002174244 A       6/2002

OTHER PUBLICATIONS

Machine Translation of Detailed Description of JP 2002-174244A; publication date: Jun. 2002.*
(Continued)

*Primary Examiner* — Fred M Teskin
(74) *Attorney, Agent, or Firm* — Browdy and Neimark, PLLC

(57) ABSTRACT

A slide member is provided with a metal back, a bearing alloy layer disposed over a first surface of the metal back, and a diamond-like carbon layer disposed at least over a second surface of the metal back, the second surface being located on an opposite side of the first surface. The diamond-like carbon layer has a hardness equal to or less than 1000 HV and when subjected to infrared spectroscopy analysis, exhibits absorption wavenumbers of following wavenumbers (1) to (5) originating from different chemical bonding states: wavenumber (1): 2800-3100 $cm^{-1}$, wavenumber (2): 1500-1800 $cm^{-1}$, wavenumber (3): 1200-1500 $cm^{-1}$, wavenumber (4): 3300-3600 $cm^{-1}$, wavenumber (5): 730-930 $cm^{-1}$.

The relation $(P1+P3)/(P1+P2+P3) \geq 0.50$ is satisfied when an integrated value of absorption rate with respect to wavenumbers (1), (2), and (3) is represented as peak area values P1, P2, and P3, respectively.

11 Claims, 6 Drawing Sheets

(51) Int. Cl.
*F16C 35/02* (2006.01)
*F16C 33/12* (2006.01)
*F16C 33/00* (2006.01)
*F16C 33/20* (2006.01)

(52) U.S. Cl.
CPC ............ *F16C 17/02* (2013.01); *F16C 33/203* (2013.01); *F16C 2202/04* (2013.01); *F16C 2206/04* (2013.01)

(58) Field of Classification Search
USPC .......................................... 384/279; 428/689
See application file for complete search history.

(56) References Cited

OTHER PUBLICATIONS

Machine Translation of Detailed Description of JP 2000-205279A; publication date: Jul. 2000.*

* cited by examiner

FIG. 6A

| | Sample | DLC LAYER OF SLIDE MEMBER | | | | | | | | | | SOFT LAYER | BEARING ALLOY |
|---|---|---|---|---|---|---|---|---|---|---|---|---|---|
| | | HARDNESS HV | PEAK AREA VALUE | | | | | PEAK AREA RATIO | | | PRIMARY COMPONENT | PRIMARY COMPONENT |
| | | | P1 | P2 | P3 | P4 | P5 | R1 | R2 | R3 | | |
| EXAMPLES | 1 | 500 | 300 | 220 | 400 | – | – | 0.76 | 0.43 | – | – | Al |
| | 2 | 1000 | 200 | 700 | 600 | – | – | 0.53 | 0.25 | – | – | Al |
| | 3 | 50 | 10 | 20 | 60 | – | 20 | 0.78 | 0.14 | – | – | Al |
| | 4 | 500 | 500 | 220 | 200 | – | – | 0.76 | 0.71 | – | – | Al |
| | 5 | 1000 | 400 | 600 | 300 | – | 20 | 0.54 | 0.57 | – | – | Al |
| | 6 | 50 | 70 | 30 | 20 | – | – | 0.75 | 0.78 | – | – | Al |
| | 7 | 500 | 300 | 220 | 400 | 60 | 600 | 0.76 | 0.43 | 0.31 | – | Al |
| | 8 | 1000 | 200 | 700 | 600 | 200 | 300 | 0.53 | 0.25 | 0.29 | – | Al |
| | 9 | 50 | 10 | 20 | 60 | 30 | 100 | 0.78 | 0.14 | 0.07 | – | Al |
| | 10 | 500 | 500 | 220 | 200 | 60 | 600 | 0.76 | 0.71 | 0.43 | – | Al |
| | 11 | 1000 | 400 | 600 | 300 | 200 | 300 | 0.54 | 0.57 | 0.44 | – | Al |
| | 12 | 50 | 70 | 30 | 20 | 30 | 100 | 0.75 | 0.78 | 0.35 | – | Al |
| | 13 | 500 | 600 | 800 | 300 | 30 | 150 | 0.53 | 0.67 | 0.77 | – | Al |
| | 14 | 1000 | 300 | 220 | 200 | 30 | 10 | 0.69 | 0.60 | 0.88 | – | Al |
| | 15 | 50 | 60 | 20 | 10 | 20 | 20 | 0.78 | 0.86 | 0.60 | – | Al |
| | 16 | 500 | 300 | 220 | 400 | – | – | 0.76 | 0.43 | – | Pb | Cu |
| | 17 | 1000 | 400 | 600 | 300 | – | 20 | 0.54 | 0.57 | – | Bi | Al |
| | 18 | 50 | 10 | 20 | 60 | 30 | 100 | 0.78 | 0.14 | 0.07 | Sn | Cu |
| | 19 | 500 | 500 | 220 | 200 | 60 | 600 | 0.76 | 0.71 | 0.43 | RESIN | Al |
| | 20 | 500 | 600 | 800 | 300 | 30 | 150 | 0.53 | 0.67 | 0.77 | Al | Cu |
| COMPARATIVE EXAMPLES | 21 | 5000 | – | – | – | – | – | – | – | – | – | Al |
| | 22 | 1500 | – | – | – | – | – | – | – | – | – | Al |
| | 23 | 900 | 10 | 100 | 20 | – | – | 0.23 | 0.33 | – | – | Al |

| Samples | | Evaluation | | | | |
|---|---|---|---|---|---|---|
| | | Crack Rank 150°C | Crack Rank 180°C | Wear Rank 150°C | Wear Rank 180°C | Fretting Damages |
| Examples | 1 | 4 | 3 | 4 | 3 | NONE |
| | 2 | 3 | 3 | 4 | 4 | NONE |
| | 3 | 4 | 3 | 3 | 3 | NONE |
| | 4 | 4 | 4 | 4 | 3 | NONE |
| | 5 | 4 | 3 | 4 | 4 | NONE |
| | 6 | 4 | 4 | 3 | 3 | NONE |
| | 7 | 4 | 3 | 4 | 4 | NONE |
| | 8 | 3 | 3 | 5 | 4 | NONE |
| | 9 | 4 | 3 | 4 | 3 | NONE |
| | 10 | 4 | 4 | 4 | 4 | NONE |
| | 11 | 4 | 3 | 5 | 4 | NONE |
| | 12 | 4 | 4 | 4 | 3 | NONE |
| | 13 | 5 | 4 | 4 | 4 | NONE |
| | 14 | 4 | 4 | 5 | 4 | NONE |
| | 15 | 5 | 4 | 4 | 3 | NONE |
| | 16 | 4 | 4 | 4 | 4 | NONE |
| | 17 | 4 | 4 | 5 | 4 | NONE |
| | 18 | 4 | 4 | 4 | 4 | NONE |
| | 19 | 5 | 4 | 5 | 4 | NONE |
| | 20 | 5 | 5 | 5 | 4 | NONE |
| Comparative Examples | 21 | 1 | 1 | — | — | PRESENT |
| | 22 | 1 | 1 | — | — | PRESENT |
| | 23 | 2 | 2 | — | — | PRESENT |

FIG. 6B

SLIDE MEMBER, HOUSING, AND BEARING DEVICE

CROSS-REFERENCE TO RELATED APPLICATION(S)

This application is based upon and claims the benefit of priority from Japanese Patent Application No. 2014-244922, filed on, Dec. 3, 2014 the entire contents of which are incorporated herein by reference.

FIELD

The present invention relates to a slide member, a housing, and a bearing device.

BACKGROUND

A bearing device is provided for example with a slide member and a housing configured to hold the slide member. The slide member is configured to slide with respect to a counter member such as a shaft member. The rotation of the shaft member causes micro slipping between the slide member and the housing. The micro slipping may cause fretting damages to the slide member and/or the housing.

Thus, in a conventional bearing device disclosed for example in JP 2002-174244 A, a hard coating having a hardness greater than 1000 HV is applied over the outer peripheral surface of the slide member configured to contact the housing or the inner peripheral surface of the housing configured to contact the slide member. The hard coating applied to the slide member or the housing increases the hardness of the contact surface and reduces fretting wears.

However, bearing devices are required to fulfill further challenging requirements imposed by improved engine performance. Because an increase in the amount of relative sliding and in the amount of deformation even in minute regions of the outer peripheral surface of the slide member and the inner peripheral surface of the housing affect the performance of the bearing device, high fretting resistance is one of the key performance factors of the bearing device. In JP 2002-174244 A, the protective hard coating may not be able to adapt to the increase in the amount of relative sliding and deformation and may eventually breakdown. The breakdown of the hard coating may cause the outer peripheral surface of the slide member and the inner peripheral surface of the housing to become exposed and lead to fretting damages.

SUMMARY

It is thus, one object of the present invention to provide a slide member, a housing, and a bearing device which provide high fretting resistance even under increasingly severe conditions.

In one embodiment, a slide member includes a metal back; a bearing alloy layer disposed over a first surface of the metal back; and a diamond-like carbon layer disposed at least over a second surface of the metal back, the second surface being located on an opposite side of the first surface. The diamond-like carbon layer has a hardness equal to or less than 1000 HV and when subjected to infrared spectroscopy analysis, exhibits absorption wavenumbers of following wavenumbers (1) to (5) originating from different chemical bonding states: wavenumber (1): 2800-3100 $cm^{-1}$, wavenumber (2): 1500-1800 $cm^{-1}$, wavenumber (3): 1200-1500 $cm^{-1}$, wavenumber (4): 3300-3600 $cm^{-1}$, and wavenumber (5): 730-930 $cm^{-1}$. The relation $(P1+P3)/(P1+P2+P3) \geq 0.50$ is satisfied when an integrated value of absorption rate with respect to wavenumber (1) is represented as peak area value P1, an integrated value of absorption rate with respect to wavenumber (2) is represented as peak area value P2, and an integrated value of absorption rate with respect to wavenumber (3) is represented as peak area value P3.

In one embodiment, a housing configured to hold a sliding member on a radially inward side thereof is provided. The housing includes a diamond-like carbon layer disposed over a surface located on the radially inward side thereof. The diamond-like carbon layer has a hardness equal to or less than 1000 HV and when subjected to infrared spectroscopy analysis, exhibits absorption wavenumbers of following wavenumbers (1) to (5) originating from different chemical bonding states: wavenumber (1): 2800-3100 $cm^{-1}$, wavenumber (2): 1500-1800 $cm^{-1}$, wavenumber (3): 1200-1500 $cm^{-1}$, wavenumber (4): 3300-3600 $cm^{-1}$, and wavenumber (5): 730-930 $cm^{-1}$. The relation $(P1+P3)/(P1+P2+P3) \geq 0.50$ is satisfied when an integrated value of absorption rate with respect to wavenumber (1) is represented as peak area value P1, an integrated value of absorption rate with respect to wavenumber (2) is represented as peak area value P2, and an integrated value of absorption rate with respect to wavenumber (3) is represented as peak area value P3.

DLC (Diamond-Like Carbon) having a controlled hardness greater than 1000HV, is sufficiently hard but brittle. Thus, the hard DLC layer may peel or may breakdown by even a slight relative slipping and slight deformation. Thus, it is possible to inhibit peeling and breakdown of the DLC layer, when an increase in the amount of relative slipping and deformation is observed in minute regions of the slide member and the housing, by controlling the hardness of the DLC layer to 1000 HV or less as is the case of the present embodiment.

The inventors of the present invention have also found that the state of chemical bonding of the DLC, in addition to the hardness of the DLC layer, also plays an important role in determining the fretting resistance and that optimization of the state of chemical bonding is effective in improving the performance of the DLC layer. DLC varies its structure from a diamond-like structure to a graphite-like structure depending upon the state of chemical bonding. For example, the state of chemical bonding of the atoms forming the DLC layer may be varied through adjustment of conditions applied when forming the DLC layer. The chemical bond varies its wavenumber of infrared absorption depending upon the state of the chemical bonding. It is thus, possible to verify the state of chemical bonding through spectroscopic analysis of the infrared spectrum. The absorption wavenumber include those described as wavenumbers (1) to (5) above.

Among wavenumbers (1) to (5), wavenumber (1) having an absorption wavenumber of 2800-3100 $cm^{-1}$ originates from $sP^3$-$CH_3$ bond or $sP^3$-$CH_2$ bond. Wavenumber (2) having an absorption wavenumber of 1500-1800 $cm^{-1}$ originates from $sP^2$-C bond. Wavenumber (3) having an absorption wavenumber of 1200-1500 $cm^{-1}$ originates from an olefenic $sP^2$-$CH_2$ bond or $sP^3$-$CH_3$ bond. Wavenumber (4) having an absorption wavenumber of 3300-3600 $cm^{-1}$ originates from sP-CH bond. Wavenumber (5) having an absorption wavenumber of 730-930 $cm^{-1}$ originates from an olefenic $sP^2$-$CH_2$ bond.

The spectroscopic analysis of infrared spectrum employs a peak area value. The peak area value is an integrated value of the spectrum in a specific wavenumber region as indicated in FIG. 5. In the example indicated in FIG. 5, the area of region S surrounded by analysis line Q and imaginary straight line L1 indicates peak area value Pn (n is an integer). The analysis line Q indicates the result of analysis and the straight line L1 links intersection C1 of lower limit wavenumber K1 and analysis line Q with intersection C2 of upper limit wavenumber K2 and analysis line Q. In the description given hereinafter, the integrated value of wavenumber (1) is referred to as peak area value P1, the integrated value of wavenumber (2) is referred to as peak area value P2, and the integrated value of wavenumber (3) is referred to as peak area value P3.

In the present embodiment, the relation between the peak area value P1, peak area value P2, and peak area value P3 can be represented as $(P1+P3)/(P1+P2+P3) \geq 0.50$. This is an indication that a large number of $sP^3\text{-}CH_3$ bonds contributing to peak area value P1 and peak area value P3 have been observed in the DLC layer. The $sP^3\text{-}CH_3$ bond improves the flexibility of the DLC compared to $sP^2$ and $sP$ bonds. Thus, durability of the DLC layer against deformation is improved when the relation $(P1+P3)/(P1+P2+P3) \geq 0.50$ is satisfied. As a result, occurrences of breakdown and peeling of the DLC layer are reduced even when the amount of relative slipping and the amount of deformation in minute regions are increased. It is thus, possible to achieve high fretting resistance even under severe conditions. The relation between the peak area value P1, peak area value P2, and peak area value P3 preferably satisfy $(P1+P3)/(P1+P2+P3) \leq 0.80$.

In the slide member of the present embodiment, the peak area value P1 and the peak area value P3 satisfy $P1/(P1+P3) \geq 0.50$.

Further, in the housing of the present embodiment, the peak area value P1 and the peak area value P3 satisfy $P1/(P1+P3) \geq 0.50$.

As described above, the peak area value P1 and the peak area value P3 originate from the $sP^3\text{-}CH_3$ bond. The peak area value P3 also originates from the $sP^2\text{-}CH_2$ bond. Thus, greater number of $sP^3\text{-}CH_3$ bonds exist in the DLC layer as the percentage of the peak area value P1 with respect to the peak area value P3 becomes greater. Thus, the flexibility of the DLC layer as well as the durability against deformation are improved when the relation $P1/(P1+P3) \geq 0.50$ are satisfied. It is thus, possible to reduce the occurrence of breakdown and peeling of the DLC layer and improve fretting resistance even more effectively. The relation between the peak area value P1 and the peak area value P3 preferably satisfy $0.65 \leq P1/(P1+P3) \leq 0.90$.

In the slide member of the present embodiment, an integrated value of absorption rate with respect to wavenumber (4) is represented as the peak area value P4 and an integrated value of absorption rate with respect to wavenumber (5) is represented as the peak area value P5.

In the housing of the present embodiment, an integrated value of absorption rate with respect to wavenumber (4) is represented as the peak area value P4 and an integrated value of absorption rate with respect to wavenumber (5) is represented as the peak area value P5.

As described above, the peak area value P4 originates from the sP-CH bond and peak area value P5 originates from the $sP^2\text{-}CH_2$ bond. The DLC layer, when containing the sP-CH bond and the $sP^2\text{-}CH_2$ bond, exhibits improved durability against deformation and improved wear resistance. It is thus, possible to reduce occurrence of breakdown and peeling of the DLC layer and improve fretting resistance.

In the slide member of the present embodiment, the relation between the peak area value P1, the peak area value P4, and the peak area value P5 satisfy $P1/(P1+P4+P5) \geq 0.50$.

In the housing of the present embodiment, the relation between the peak area value P1, the peak area value P4, and the peak area value P5 satisfy $P1/(P1+P4+P5) \geq 0.50$.

Wear resistance and durability against deformation of the DLC layer are both improved when the relation of $P1/(P1+P4+P5) \geq 0.50$ is satisfied. It is thus, possible to improve fretting resistance. The relation between the peak area value P1, the peak area value P4, and the peak area value P5 preferably satisfy $P1/(P1+P4+P5) \geq 0.75$.

The slide member of the present embodiment is provided with a soft layer, being softer than the bearing alloy layer, over the surface of the bearing alloy layer.

It is possible to relax the external force applied by the counter member sliding with the bearing device by providing the soft layer over the surface of the bearing alloy layer. More specifically, the external force transmitted to the DLC layer, provided over a surface of the metal back located in the opposite side of the surface where the bearing alloy layer is provided, is absorbed by the deformation of the soft layer. It is thus, possible to relax deformation and wear of the DLC layer by providing the soft layer on the bearing alloy layer side. As a result, it is possible to improve fretting resistance.

The bearing device of the present embodiment is provided with at least either of the above described slide member and the housing.

It is thus, possible to reduce occurrence of breakdown and peeling of the DLC layer provided at the slide member or the housing and thereby improve fretting resistance of the bearing device.

BRIEF DESCRIPTION OF THE DRAWINGS

FIGS. 6A and 6B taken together provide a chart briefly indicating the result of verification of a slide member of one embodiment.

DESCRIPTION

Embodiments will be described hereinafter with reference to the drawings.

First, a description will be given on an engine employing a bearing device of the present embodiment. In one embodiment, the bearing device is used for example in a diesel engine or a gasoline engine application.

Figure 2:
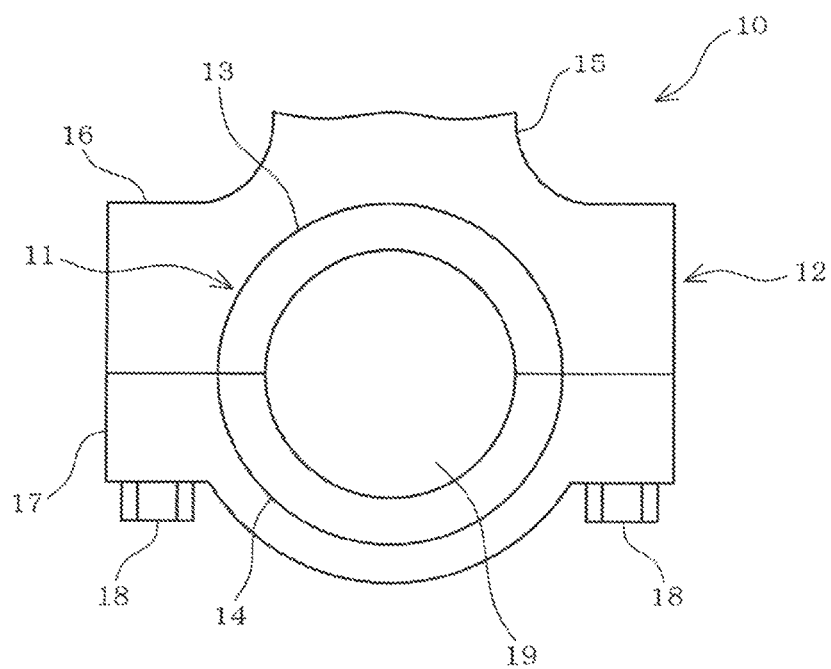
FIG. 2 is a schematic view of a bearing device employing a slide member and a housing of one embodiment as viewed from the direction indicated by arrow II in FIG. 3.
Figure 3:
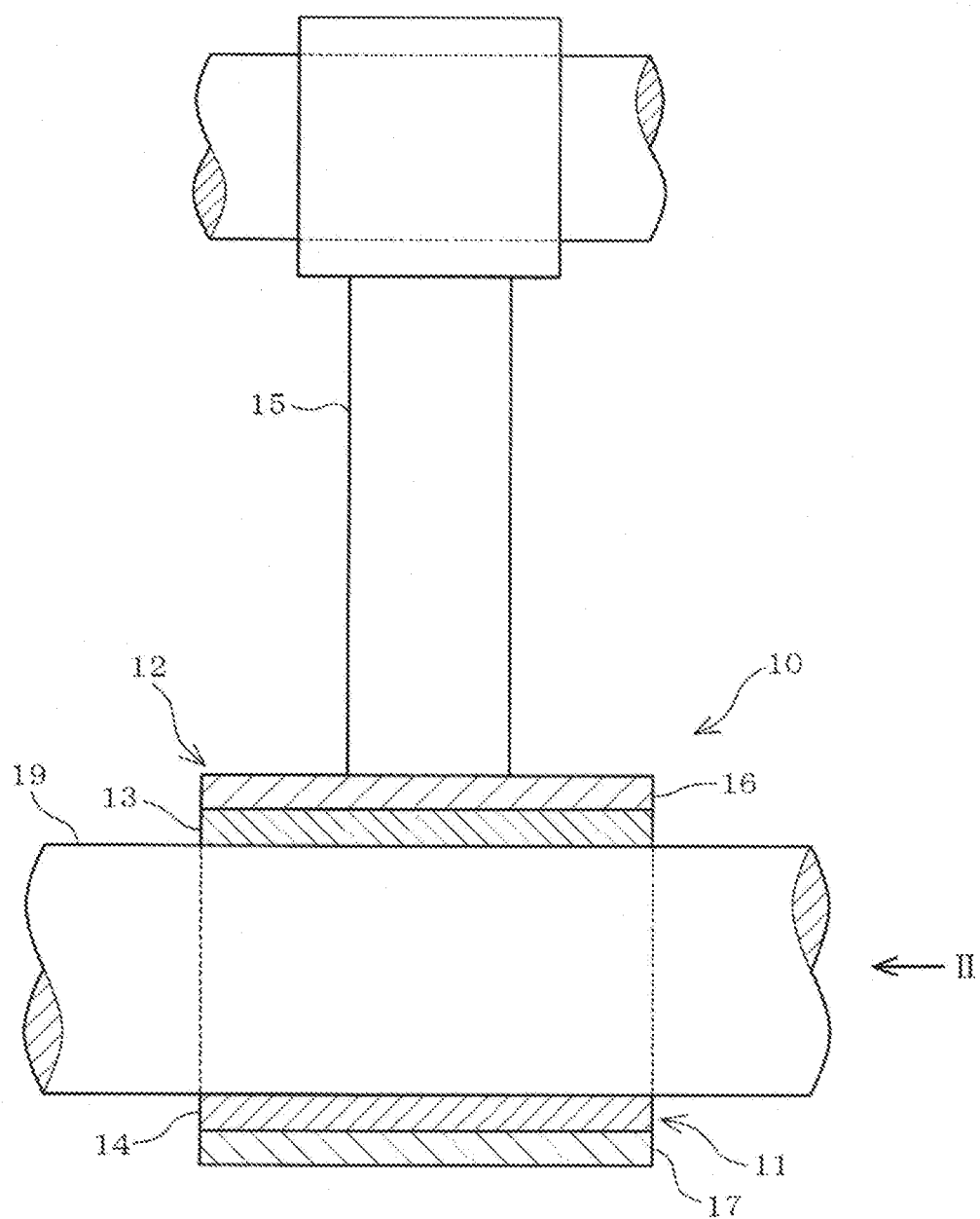
FIG. 3 is a schematic view of a bearing device employing a slide member and a housing of one embodiment.

As illustrated in FIGS. 2 and 3, a bearing device 10 is provided with a slide member 11 and a housing 12. In one embodiment, the slide member 11 is formed in the shape of a cylinder and is divided in two along a surface encompassing its axial center. That is, the slide member 11 is formed of an upper member 13 and a lower member 14 each being shaped like a half cylinder. The slide member 11 divided in two are stored in an inner peripheral side of the housing 12. The housing 12 is a part of a connecting rod 15 of an engine. One longer side end of the connecting rod 15 located in the opposite side with respect to the housing 12 is connected to a piston not illustrated. The housing 12 is provided with an upper housing 16 and a lower housing 17 which are separable from one another. The lower housing 17 stores a slide member 11 in a space located between itself and the upper housing 16.

The slide member 11 divided in two is installed between the upper housing 16 and the lower housing 17. As illustrated in FIG. 2, the upper housing 16 and the lower housing 17 being independent of one another are assembled as one by a fastening member such as bolts 18. The bolts 18 extending through the lower housing 17 are screwed into the upper housing 16 to connect the upper housing 16 and the lower housing 17 in one while holding the divided sliding members 11 on their inner sides. The outer diameter of the slide member 11 is slightly greater than the inner diameter of the housing 12. Thus, the bearing member 11 is squeezed radially inward when the upper housing 16 and the lower housing 17 are fastened by bolts 18. The slide member 11 is thus, secured firmly to the housing 12. The counter member, which is a shaft member 19 in the present embodiment, extends through the inner peripheral side of the slide member 11 secured to the housing 12.

Figure 1:
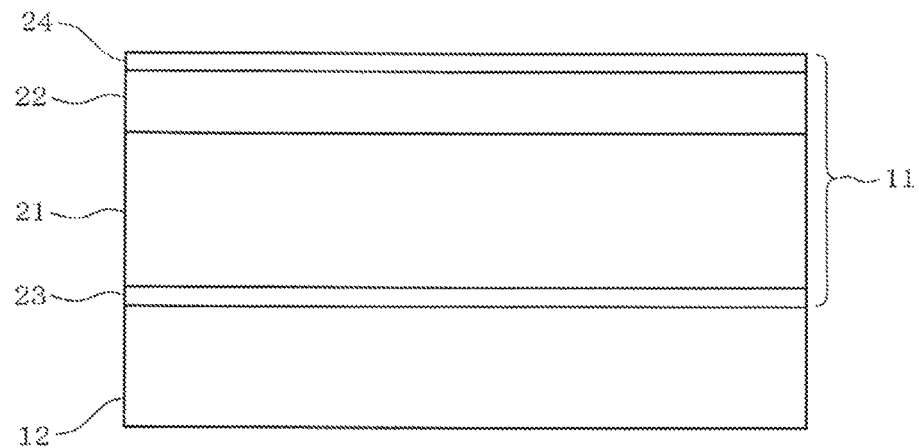
FIG. 1 is a schematic view illustrating a structure of one embodiment of a slide member.

In the present embodiment, the slide member 11 is provided with a metal back 21 and a bearing alloy layer 22 as illustrated in FIG. 1. The metal back 21 is made of steel. The bearing alloy layer 22 is provided along a surface located on one side of the metal back 21. More specifically, the bearing alloy layer 22 is provided along a surface which is configured to slide with respect to the shaft member 19 serving as the counter member. That is, the bearing alloy layer 22 is provided over an inner peripheral surface side of the slide member 11 being shaped like a cylinder. The bearing alloy layer 22 is formed of for example copper (Cu) or aluminum (Al), etc. The bearing alloy layer 22 may be formed of an alloy containing copper (Cu) or aluminum (Al), etc. as a main component. Examples of alloys in which Cu is the main component include Cu—Sn, Cu—Sn—Ni, Cu—Sn—Pb, Cu—Sn—Bi, Cu—Pb, Cu—Zn, Cu—Zn—Bi systems or the like, and may contain hard particles. Examples of alloys in which Al is the main component include Al—Sn—Si, Al—Sn, Al—Sn, Al—Sn—Cu, Al—Zn—Si systems or the like.

The slide member 11 is provided with a DLC layer 23 in addition to the above described metal back 21 and the bearing alloy layer 22. The DLC layer 23 is formed of a DLC (Diamond-Like Carbon). The DLC layer 23 is provided along a surface of the metal back 21 located on the opposite side of the surface of the metal back 21 where the bearing alloy layer 22 is provided. For example, when the slide member 11 is shaped like a cylinder, the bearing alloy layer 22 is provided along the inner peripheral side of the slide member 11. The DLC layer 23 contacts the inner peripheral surface of the housing 12 when the slide member 11 is mounted on the housing 12. The DLC layer 23 is required at least along the outer peripheral surface of the slide member 11. Thus, the DLC layer 23 may be provided along surfaces other than the outer peripheral surface of the slide member 11, such as along the surface of the axial end of the metal back 21, as long as it is not formed along the surface where the bearing alloy layer 22 is formed. The housing 12 is formed of metal such as steel, aluminum (Al), copper (Cu), or titanium (Ti). The housing 12 may also be formed of an alloy containing either of the foregoing metals as a main component. Examples of steel include chromium molybdenum steel (SCM steel), carbon steel, and cast iron. Examples of alloys containing Al as a main component include A2017, A2014, AC2B, AC4A, and ADC12. Examples of alloys containing Ti as a main component include Ti—Al—V system.

The slide member 11 may be provided with the soft layer 24 or an intermediate layer not illustrated. The soft layer 24 is configured to be softer than the bearing alloy layer 22. The soft layer 24 is formed of lead (Pb), tin (Sn), or bismuth (Bi). The soft layer 24 may also be formed of an alloy containing either of the foregoing materials as a main component. Further, alternatively, the soft layer 24 may be formed of resin. The soft layer 24 is formed by wet plating, dry plating, or the like. The soft layer 24 is provided over the surface of the bearing alloy layer 22, in other words, the sliding surface side of the bearing alloy layer 22. Examples of the soft layer 24 containing Pb as the main component include Pb—Sn, Pb—Sn—Cu, Pb—Sn—In, and Pb—Sn—In—Cu systems. Examples of the soft layer 24 containing Sn as the main component include Sn—Cu, Sn—Bi, Sn—Ag, Sn—Sb, Sn—Sb—Cu, and Sn—Sb—Ag systems. Examples of the soft layer 24 containing Bi as the main component include Bi—Cu, Bi—Sn, and Bi—Ag systems. The soft layer 24 formed of resin may be obtained by adding a solid lubricant and hard particles to a binder. Examples of a binder include polyamideimide (PAI), polyimide (PI), and polyamide (PA). Examples of a solid lubricant include $MoS_2$, h-BN, PTFE, and Gr. Examples of hard particles include SiC, $Si_3N_4$, $Fe_2O_3$, and $Al_2O_3$. An intermediate layer not illustrated may be provided between the metal back 21 and the DLC layer 23. The intermediate layer improves the bonding between the metal back 21 and the DLC layer 23. The intermediate layer may be formed of chrome (Cr), titanium (Ti), silicon (Si), or tungsten (W). The intermediate layer may also be formed of an alloy or a mixture containing either of the foregoing materials as the main component.

Next, a description will be given in detail on the DLC layer 23 of the present embodiment.

Figure 4:
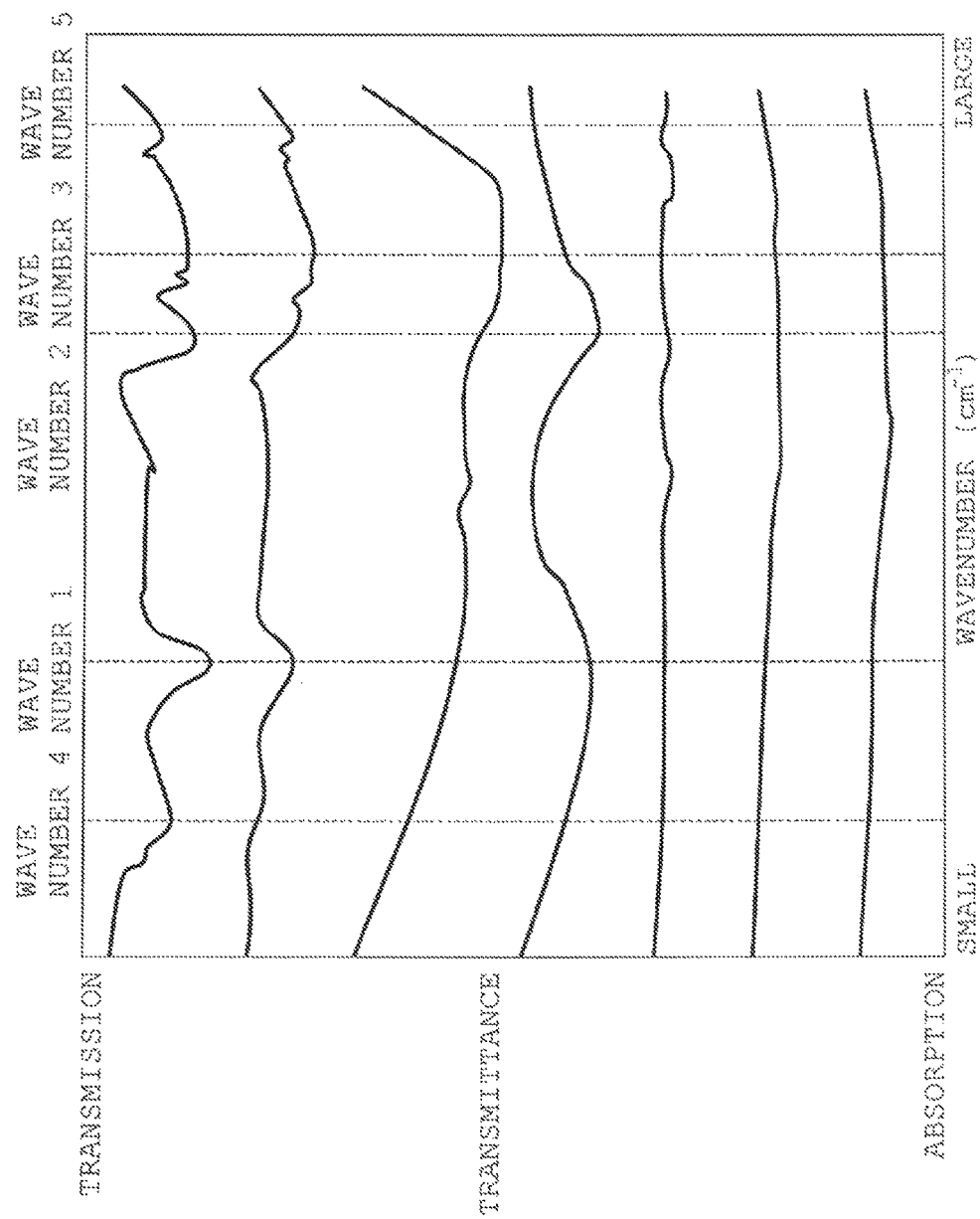
FIG. 4 is a view briefly illustrating an example of infrared spectrum of a DLC layer.

In the present embodiment, the hardness of the DLC layer 23 of the slide member 11 is controlled to be equal to or less than 1000 HV. The state of chemical bonding of the DLC layer 23 is further controlled in the present embodiment. The state of chemical bonding of the DLC layer 23 is verified by spectroscopic analysis of the infrared spectrum. The spectroscopic analysis of the infrared spectrum of the DLC layer 23 reveals distinctive absorption wavenumbers represented as wavenumbers (1) to (5) in FIG. 4. The following provides a description of the absorption wavenumbers.

Wavenumber (1): 2800-3100 $cm^{-1}$, originates from $sP^3$-$CH_3$ bond or $sP^3$-$CH_2$ bond.

Wavenumber (2): 1500-1800 $cm^{-1}$, originates from $sP^2$-C bond.

Wavenumber (3): 1200-1500 $cm^{-1}$, originates from an olefenic $sP^2$-$CH_2$ bond or $sP^3$-$CH_3$ bond.

Wavenumber (4): 3300-3600 $cm^{-1}$, originates from sP-CH bond.

Wavenumber (5): 730-930 $cm^{-1}$ originates from an olefenic $sP^2$-$CH_2$ bond.

Figure 5:
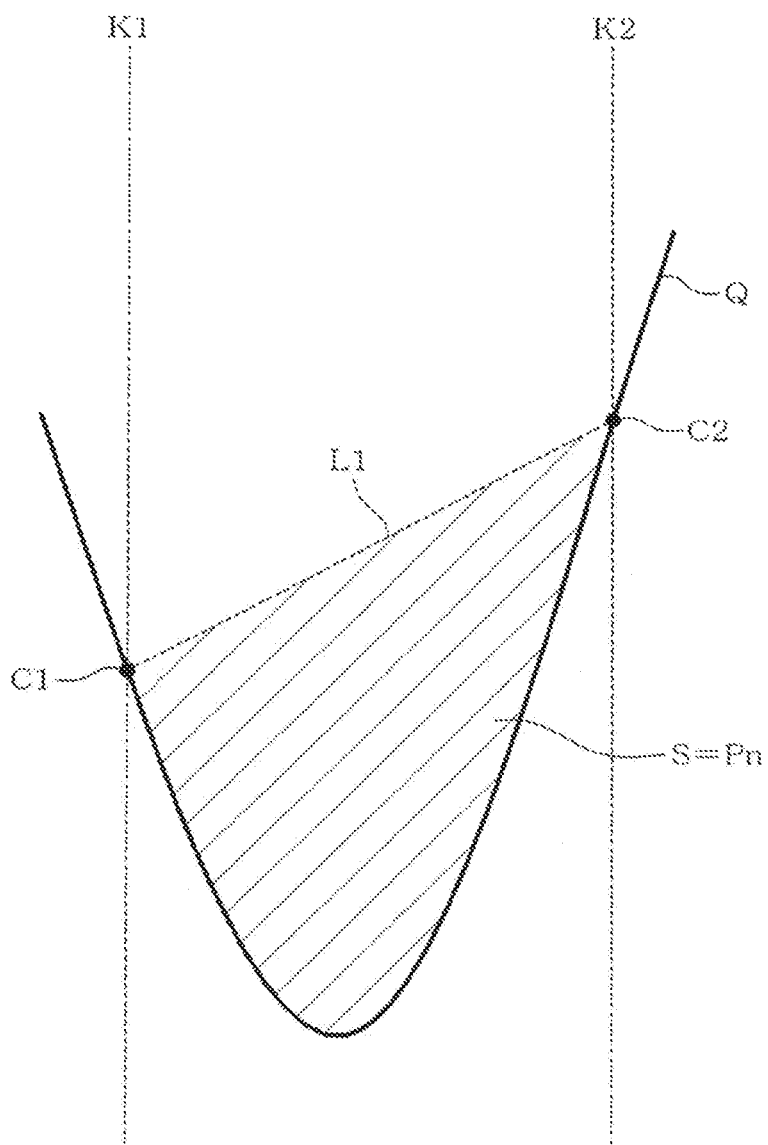
FIG. 5 is a schematic view for explaining how to calculate a peak area ratio.

In the present embodiment, the DLC layer 23 is examined based on peak area values Pn (n=1 to 5) obtained for wavenumbers (1) to (5). The peak area value Pn is an integrated value of the spectrum in a specific wavenumber region as indicated in FIG. 5. In the example indicated in FIG. 5, the area of region S surrounded by analysis line Q and imaginary straight line L1 indicates peak area value Pn. The analysis line Q indicates the result of analysis and the straight line L1 links intersection C1 of lower limit wavenumber K1 and analysis line Q with intersection C2 of upper limit wavenumber K2 and analysis line Q. As described earlier, the peak area value P1 is an integrated value of wavenumber (1), the peak area value P2 is an integrated value of wavenumber (2), the peak area value P3 is an integrated value of wavenumber (3), the peak area value P4 is an integrated value of wavenumber (4), and the peak area value P5 is an integrated value of wavenumber (5).

In the DLC layer 23 of the present embodiment, a peak area ratio R1 is calculated as follows using the peak area value P1, the peak area value P2, and the peak area value P3.

$$R1=(P1+P3)/(P1+P2+P3)$$

The peak area ratio R1 falls in the range of R1≥0.50 which is an indication that the DLC layer 23 contains large number of $sP^3$-$CH_3$ bonds contributing to the peak area value P1 and the peak area value P3. The $sP^3$-$CH_3$ bond improves the flexibility of the DLC compared to $sP^2$ and $sP$ bonds. Thus, durability of the DLC layer against deformation is improved when R1≥0.50 is satisfied.

As described above, the peak area value P1 and the peak area value P3 originate from the $sP^3$-$CH_3$ bond. The peak area value P3 also originates from the $sP^2$-$CH_2$ bond. Thus, greater number of $sP^3$-$CH_3$ bonds exist in the DLC layer as the percentage of the peak area value P1 with respect to the peak area value P3 becomes greater.

In the DLC layer 23 of the present embodiment, a peak area ratio R2 is calculated as follows using the peak area value P1 and the peak area value P3.

$$R2=P1/(P1+P3)$$

The peak area ratio R2 falls in the range of R2≥0.50 which is an indication that the DLC layer 23 contains further greater number of $sP^3$-$CH_3$ bonds. Thus, the flexibility of the DLC layer 23 is further improved to improve the durability of the DLC layer against deformation even more effectively.

The DLC layer 23 of the present embodiment may further contain the peak area value P4 originating from the sP-CH bond and peak area value P5 originating from the $sP^2$-$CH_2$ bond. The DLC layer 23, when containing the sP-CH bond and the $sP^2$-$CH_2$ bond, exhibits improved durability against deformation and improved wear resistance.

In the DLC layer 23 of the present embodiment, a peak area ratio R3 is calculated as follows using the peak area value P1, the peak area value P4, and the peak area value P5.

$$R3=P1/(P1+P4+P5)$$

The peak area ratio R3 falls in the range of R3≥0.50. The durability against deformation and wear resistance of the DLC layer 23 are improved when R3≥0.50 is satisfied.

Next, a description will be given on the method of manufacturing the slide member 11 configured as described above.

The metal back 21 and the bearing alloy layer 22 of the slide member 11 are manufactured using a method known in the art. A substrate formed of the metal back 21 and the bearing alloy layer 22 is stored in an apparatus for forming the DLC layer 23. First, hydrogen gas is introduced into the apparatus and certain level of voltage is applied to the substrate stored in the apparatus. The DLC layer 23 is formed over the voltage-applied substrate by plasma-enhanced chemical vapor deposition (CVD) or physical vapor deposition (PVD). The state of chemical bonding of the DLC layer 23 is controlled by controlling the level of voltage applied to the substrate and the amount of hydrogen gas introduced into the apparatus.

More specifically, hydrogen gas is introduced into the apparatus storing the substrate prior to the formation of the DLC layer 23. A relatively low bias of 100V or less is applied to the substrate stored in the apparatus. The DLC layer 23 is formed by feeding a source gas of the DLC layer 23 and hydrogen gas while controlling the level of voltage applied to the substrate. The amount of hydrogen gas introduced into the apparatus and the level of voltage applied to the substrate affects the diffusion of source gas, adsorption, disassociation, chemical reaction, and layer growth taking place at the surface of the substrate during the formation of the DLC layer. The state of chemical bonding of the DLC layer 23 being formed over the substrate is controlled through adjustment in the amount of hydrogen gas and the level of voltage applied to the substrate before and during the formation of the DLC layer 23. After forming the DLC layer 23, a layer serving as the soft layer 24 is formed over the substrate.

One embodiment was described through an example in which the DLC layer 23 is formed along the outer peripheral surface side of the slide member 11. However, it is only required to form the DLC layer 23 along a surface where the slide member 11 and the housing 12 contact one another. Thus, the DLC layer 23 may be formed along the inner peripheral surface of the housing 12 instead of along the outer peripheral surface of the slide member 11.

EXAMPLES

Next, a description is given on EXAMPLES of the above described slide member 11.

As indicated in FIGS. 6A and 6B, verification of the slide member 11 was conducted based on samples 1 to 20 serving as EXAMPLES and samples 21 to 23 serving as COMPARATIVE EXAMPLES. Verification was made through hydraulic vibration test and vibration test. The vibration test was conducted by mounting the slide member 11 to the housing 12 provided integrally with the connecting rod 15 of an automobile engine as illustrated in FIGS. 2 and 3. The slide member 11 mounted on the housing 12 supports the shaft member 19 serving as the counter member. In the vibration test, 30 kN of vibration load was applied to the shaft member 19. The following conditions were applied in the vibration test. Oil clearance between the slide member 11 and the shaft member 19 was specified to 0.05 mm. The frequency of the vibration performed in the vibration test was specified to 60 Hz. The count of vibration performed in the vibration test was specified to $5\times10^6$ times. The oscillation test was conducted at 150 degrees Celsius and 180 degrees Celsius.

The result of verification is given in the chart provided in FIGS. 6A and 6B. Crack formation and wear caused by deformation was evaluated in the scale of "1" to "5" as follows.

Crack rank 1: Severe cracks were formed accompanying peeling of the DLC layer throughout the outer peripheral surface of the slide member where the DLC layer is formed.

Crack rank 2: Severe cracks were formed though peeling of the DLC layer was not observed throughout the outer peripheral surface of the slide member where the DLC layer is formed.

Crack rank 3: Cracks were slightly formed in the outer peripheral surface of the slide member where the DLC layer is formed.

Crack rank 4: Minute cracks were slightly formed in the outer peripheral surface of the slide member where the DLC layer is formed.

Crack rank 5: No cracks were observed in the outer peripheral surface of the slide member where the DLC layer is formed.

Wear rank 1: Severe wear was observed accompanying peeling of the DLC layer throughout the outer peripheral surface of the slide member where the DLC layer is formed.

Wear rank 2: Severe wear was observed accompanying peeling of the DLC layer in the outer peripheral surface of the slide member where the DLC layer is formed.

Wear rank 3: Slight wear of the DLC layer was observed throughout the outer peripheral surface of the slide member where the DLC layer is formed.

Wear rank 4: Slight wear of the DLC layer was observed in the outer peripheral surface of the slide member where the DLC layer is formed.

Wear rank 5: No wear of the DLC layer was observed in the outer peripheral surface of the slide member where the DLC layer is formed.

An evaluation was made that no fretting damages were observed when the crack rank as well as the wear rank were 3 or greater. The fretting resistance increases as the numeric scale of the crack rank and the wear rank become greater.

(Regarding Peak Area Ratio R1)

In each of the EXAMPLES (SAMPLES 1 to 20), the hardness of the DLC layer 23 is equal to or less than 1000 HV and the peak area ratio R1 falls in the range of R1≥0.50. Fretting damages were not observed in any of the samples 1 to 20. In contrast, fretting damages were observed in COMPARATIVE EXAMPLES (samples 21 and 22) in which the hardness of the DLC layer 23 is greater than 1000 HV. Fretting damages were observed in sample 23 despite the hardness of the DLC layer 23 is equal to or less than 1000 HV since the peak area ratio R1 does not fall in the range of R1≥0.50.

It was thus, found in the present embodiment that it is possible to reduce the occurrence of fretting damages by controlling the hardness of the DLC layer 23 and the peak area ratio R1.

(Regarding Peak Area Ratio R2)

In the DLC layers 23 of samples 4 to 6, the peak area ratio R2 falls in the range of R2≥0.50. Thus, the crack ranks of samples 4 to 6 are improved as compared to the crack ranks of samples 1 to 3 in which the peak area ratio R2 falls in the range of R2<0.50.

As a result, it can be understood that flexibility is improved in the DLC layers 23 having greater amount of $sP^3$-$CH_3$ bonds which in turn improves durability against deformation of the DLC layers 23. Further, the DLC layers 23 having greater amount of $sP^3$-$CH_3$ bonds clearly contribute more effectively in reducing fretting damages.

(Regarding Peak Area Values P4, P5)

DLC layers 23 of samples 7 to 9 each contain peak area value P4 and peak area value P5. Thus, wear resistance is improved in samples 7 to 9 compared to samples 1 to 3 which do not contain peak area value P4 and peak area value P5 in their DLC layers. Further, DLC layers 23 of samples 10 to 12 each contain peak area value P4 and peak area value P5. Thus, wear resistance is improved in samples 10 to 12 compared to samples 4 to 6 which do not contain peak area value P4 and peak area value P5 in their DLC layers. It can thus, be understood that durability against deformation as well as wear resistance of the DLC layer 23 are improved by containing sP-CH bonds that provide peak area value P4 and $sP^2$-$CH_2$ bonds that provide peak area value P5.

(Regarding Peak Area Ratio R3)

In samples 13 to 15, the peak area ratio R3 calculated from peak area value P4 and peak area value P5 falls in the range of R3≥0.50. Thus, the crack rank is improved as compared to samples 10 to 12 in which peak area ratio R3 falls in the range of R3<0.50.

Thus, it can be understood that it is possible to maintain good wear resistance and further improve durability against deformation of the DLC layer 23 by controlling the ratio of the sP-CH bonds and $sP^2$-$CH_2$ bonds. As a result, it is possible to improve the fretting resistance of the DLC layer 23.

(Regarding Soft Layer)

Samples 16 to samples 20 are each provided with the soft layer 24 over the surface of the bearing alloy layer 22. It can be understood that the crack rank and the wear rank of samples 16 to 20 are improved as compared to samples 1 to 15 in which the soft layer 24 is not provided. It can thus, be understood that deformation as well as wear of the DLC layer 23 have been relaxed by providing the soft layer 24 over the surface of the bearing alloy layer 22 since the external force transmitted from the shaft member 19 to the DLC layer 23 is relaxed by the presence of the soft layer 24.

It was thus, found that fretting resistance of the DLC layer 23 can be significantly improved by providing the soft layer 24.

The foregoing description and drawings are merely illustrative of the principles of the present invention and are not to be construed in a limited sense. Various changes and modifications will become apparent to those of ordinary skill in the art. All such changes and modifications are seen to fall within the scope of the invention as defined by the appended claims.

What is claimed is:

1. A slide member comprising:
   a metal back;
   a bearing alloy layer disposed over a first surface of the metal back; and
   a diamond-like carbon layer disposed at least over a second surface of the metal back, the second surface being located on an opposite side of the first surface;
   wherein the diamond-like carbon layer has a hardness equal to or less than 1000 HV and when subjected to infrared spectroscopy analysis, exhibits absorption wavenumbers of following wavenumbers (1) to (5) originating from different chemical bonding states:
   wavenumber (1): 2800-3100 $cm^{-1}$
   wavenumber (2): 1500-1800 $cm^{-1}$
   wavenumber (3): 1200-1500 $cm^{-1}$
   wavenumber (4): 3300-3600 $cm^{-1}$
   wavenumber (5): 730-930 $cm^{-1}$, and
   wherein (P1+P3)/(P1+P2+P3)≥0.50 when an integrated value of absorption rate with respect to wavenumber (1) is represented as peak area value P1, an integrated value of absorption rate with respect to wavenumber (2) is represented as peak area value P2, and an integrated value of absorption rate with respect to wavenumber (3) is represented as peak area value P3.

2. The slide member according to claim 1, wherein the peak area value P1 and the peak area value P3 satisfy P1/(P1+P3)≥0.50.

3. The slide member according to claim 2, wherein an integrated value of absorption rate with respect to wavenumber (4) is represented as the peak area value P4 and an integrated value of absorption rate with respect to wavenumber (5) is represented as the peak area value P5.

4. The slide member according to claim 3, wherein the peak area value P1, the peak value P4, and the peak area value P5 satisfy P1/(P1+P4+P5)≥0.50.

5. The slide member according to claim 1, further comprising a soft layer disposed over a surface of the bearing alloy layer, the soft layer being softer than the bearing alloy layer.

6. A housing configured to hold a sliding member on a radially inward side thereof, the housing comprising:
a diamond-like carbon layer disposed over a surface located on the radially inward side thereof,
wherein the diamond-like carbon layer has a hardness equal to or less than 1000 HV and when subjected to infrared spectroscopy analysis, exhibits absorption wavenumbers of following wavenumbers (1) to (5) originating from different chemical bonding states:
Wavenumber (1): 2800-3100 $cm^{-1}$
wavenumber (2): 1500-1800 $cm^{-1}$
wavenumber (3): 1200-1500 $cm^{-1}$
wavenumber (4): 3300-3600 $cm^{-1}$
wavenumber (5): 730-930 $cm^{-1}$, and
wherein (P1+P3)/(P1+P2+P3)≥0.50 when an integrated value of absorption rate with respect to wavenumber (1) is represented as peak area value P1, an integrated value of absorption rate with respect to wavenumber (2) is represented as peak area value P2, and an integrated value of absorption rate with respect to wavenumber (3) is represented as peak area value P3.

7. The housing according to claim 6, wherein the peak area value P1 and the peak area value P3 satisfy P1/(P1+P3)≥0.50.

8. The housing according to claim 7, wherein an integrated value of absorption rate with respect to wavenumber (4) is represented as the peak area value P4 and an integrated value of absorption rate with respect to wavenumber (5) is represented as the peak area value P5.

9. The housing according to claim 8, wherein the peak area value P1, the peak value P4, and the peak area value P5 satisfy P1/(P1+P4+P5)≥0.50.

10. A bearing device comprising the slide member according to claim 1.

11. A bearing device comprising the housing according to claim 6.

* * * * *